US011616606B2

(12) United States Patent
Sun et al.

(10) Patent No.: US 11,616,606 B2
(45) Date of Patent: Mar. 28, 2023

(54) CELL EDGE RELIABILITY IMPROVEMENTS

(71) Applicant: Apple Inc., Cupertino, CA (US)

(72) Inventors: Haitong Sun, Irvine, CA (US); Wei Zhang, Santa Clara, CA (US); Tianyan Pu, Cupertino, CA (US); Dawei Zhang, Saratoga, CA (US); Wei Zeng, San Diego, CA (US); Yuchul Kim, Santa Clara, CA (US); Yu Zhang, Beijing (CN); Wanping Zhang, San Jose, CA (US); Jia Tang, San Jose, CA (US); Yang Li, Plano, TX (US)

(73) Assignee: Apple Inc., Cupertino, CA (US)

( * ) Notice: Subject to any disclaimer, the term of this patent is extended or adjusted under 35 U.S.C. 154(b) by 164 days.

(21) Appl. No.: 16/735,049

(22) Filed: Jan. 6, 2020

(65) Prior Publication Data

US 2020/0220665 A1 Jul. 9, 2020

(30) Foreign Application Priority Data

Jan. 9, 2019 (CN) .......................... 201910019132.1

(51) Int. Cl.
*H04L 1/1812* (2023.01)
*H04L 5/00* (2006.01)
(Continued)

(52) U.S. Cl.
CPC ......... *H04L 1/1812* (2013.01); *H04B 7/0452* (2013.01); *H04L 5/0055* (2013.01);
(Continued)

(58) Field of Classification Search
CPC ... H04L 1/1812; H04L 5/0073; H04L 5/0055; H04L 1/189; H04L 1/1822; H04L 5/0053;
(Continued)

(56) References Cited

U.S. PATENT DOCUMENTS 9,100,979 B2    8/2015  Song
9,313,672 B2 *  4/2016  Caretti .................. H04B 7/022
(Continued)

FOREIGN PATENT DOCUMENTS

CN      103155467 A     6/2013
CN      109151931 A     1/2019
(Continued)

OTHER PUBLICATIONS

Extended European Search Report from Application No. 20150928.8-1205, dated Jun. 12, 2020, ten pages.
(Continued)

*Primary Examiner* — Hanh N Nguyen
(74) *Attorney, Agent, or Firm* — Kowert, Hood, Munyon, Rankin & Goetzel, P.C.

(57) ABSTRACT

Apparatuses, systems, and methods for performing uplink and downlink communication in cell edge scenarios with improved reliability. A wireless device may establish a radio resource control connection with a first cell. The wireless device may determine that a second cell strongly interferes with communication with the first cell. The wireless device may provide an indication that the second cell is a strongly interfering cell to the first cell. The first cell may coordinate with the second cell to transmit data to the wireless device, and to receive data from the wireless device, based at least in part on the indication that the second cell is a strongly interfering cell.

20 Claims, 12 Drawing Sheets

(51) Int. Cl.
*H04W 72/04* (2023.01)
*H04B 7/0452* (2017.01)
*H04W 72/12* (2023.01)

(52) U.S. Cl.
CPC ......... *H04L 5/0073* (2013.01); *H04W 72/042* (2013.01); *H04W 72/0413* (2013.01); *H04W 72/1278* (2013.01)

(58) Field of Classification Search
CPC ... H04L 5/0044; H04L 5/0094; H04L 1/0026; H04W 72/042; H04W 72/1278; H04W 72/0413; H04W 72/082; H04W 72/1263; H04W 72/1231; H04W 76/11; H04B 7/0452; H04B 7/0413; H04B 7/0626; H04J 11/0053
See application file for complete search history.

(56) References Cited

U.S. PATENT DOCUMENTS

| | | | |
|---|---|---|---|
| 9,621,308 | B2 | 4/2017 | Krishnamurthy |
| 9,781,714 | B2* | 10/2017 | Lorca Hernando ... H04L 1/0003 |
| 10,057,916 | B2 | 8/2018 | Barabell |
| 10,367,677 | B2 | 7/2019 | Parkvall |
| 10,390,251 | B2 | 8/2019 | Uemura |
| 10,397,913 | B2 | 8/2019 | Dinan |
| 10,419,162 | B2* | 9/2019 | Hakola ............... H04W 72/042 |
| 10,637,630 | B2* | 4/2020 | Park ...................... H04W 72/14 |
| 10,707,923 | B2* | 7/2020 | John Wilson ......... H04W 76/27 |
| 2014/0198744 | A1 | 7/2014 | Wang |
| 2017/0310430 | A1* | 10/2017 | Terry .................... H04L 1/1887 |
| 2018/0034365 | A1 | 2/2018 | Sicard |
| 2018/0092156 | A1 | 3/2018 | Kim |
| 2018/0254863 | A1 | 9/2018 | Choi |
| 2018/0343653 | A1 | 11/2018 | Guo et al. |
| 2019/0103908 | A1* | 4/2019 | Yu ........................ H04B 7/0695 |
| 2019/0182730 | A1 | 6/2019 | Yeh |
| 2019/0281587 | A1* | 9/2019 | Zhang ................... H04L 5/0053 |
| 2020/0220631 | A1* | 7/2020 | Onggosanusi ........ H04W 24/08 |
| 2021/0250981 | A1* | 8/2021 | Takeda ...................... H04L 1/08 |
| 2022/0110138 | A1* | 4/2022 | Miao ..................... H04L 1/0072 |
| 2022/0141862 | A1* | 5/2022 | Bai ........................ H04B 7/088 370/329 |

FOREIGN PATENT DOCUMENTS

| | | |
|---|---|---|
| EP | 3075205 A1 | 10/2016 |
| KR | 10-2010-0084102 A | 7/2010 |
| KR | 10-2013-0069836 A | 6/2013 |
| KR | 10-2017-0061715 A | 6/2017 |
| KR | 10-2018-0070763 A | 6/2018 |
| WO | WO2012/044988 | 4/2012 |
| WO | 2017/146294 A1 | 8/2017 |
| WO | 2017155290 | 9/2017 |
| WO | WO2018/031746 | 2/2018 |
| WO | 2018232090 A1 | 12/2018 |

OTHER PUBLICATIONS

Notice of Preliminary Rejection for KR Patent Application No. 10-2020-0003117; dated Jul. 8, 2021.
Preliminary Rejection for KR Application No. 10-2020-0003117, dated Jan. 26, 2021, 17 pages.
First Office Action for CN Patent Application No. 201910019132.1; dated Oct. 9, 2021.
Office Action for Korean Patent Application No. 10-2020-0003117; dated Feb. 14, 2022.
Final Office Action for Korean Patent Application No. 10-2020-0003117; dated Dec. 21, 2021.
Notice of Allowance for CN Patent Application No. 201910019132.1; 4 pages; dated Oct. 28, 2022.

* cited by examiner

CELL EDGE RELIABILITY IMPROVEMENTS

PRIORITY DATA

This application claims benefit of priority to Chinese Application No. 201910019132.1, titled "Cell Edge Reliability Improvements", filed Jan. 9, 2019, which is hereby incorporated by reference in its entirety as though fully and completely set forth herein.

FIELD

The present application relates to wireless devices, and more particularly to apparatus, systems, and methods for performing uplink and downlink communication in cell edge scenarios with improved reliability.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for performing uplink and downlink communication in cell edge scenarios with improved reliability.

According to the techniques described herein, a reporting framework may be provided for determining and reporting when a wireless device is in a cell edge scenario in which another cell is strongly interfering with communication with the serving cell of the wireless device.

When the wireless device does determine and report that another cell is strongly interfering with communication with the serving cell of the wireless device, the network to which the wireless device is attached may implement one or more techniques for providing improved reliability in view of the strongly interfering cell, which may include the serving cell of the wireless device coordinating with the strongly interfering cell when performing uplink and/or downlink communications with the wireless device.

For example, techniques are described according to which the serving cell and the strongly interfering cell can both transmit the same packet to the wireless device, either on separate downlink channels or on a single downlink channel as distributed transmission points for a MIMO transmission. Such an approach may increase the likelihood of the packet being successfully received by the wireless device.

As another example, the serving cell and the strongly interfering cell can coordinate such that only one transmits to the wireless device at a time, while the other mutes transmission to the wireless device to reduce potential interference, which may also increase the likelihood of the packet being successfully received by the wireless device. The network may determine which cell transmits and which cell mutes transmissions dynamically, e.g., depending on which cell is currently stronger for the wireless device, which may be enabled by configuring the wireless device to frequently provide channel state information for channels between the wireless device and each of the serving cell and the strongly interfering cell.

Additionally, techniques are described herein that can be used to provide enhanced beam management in view of the possibility of communication being performed between a wireless device and either or both of multiple cells while in such a cell edge scenario.

Further, techniques are described herein according to which the serving cell and the strongly interfering cell can both receive an uplink communication from the wireless device. This may increase the likelihood of the uplink communication being successfully received by the network.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
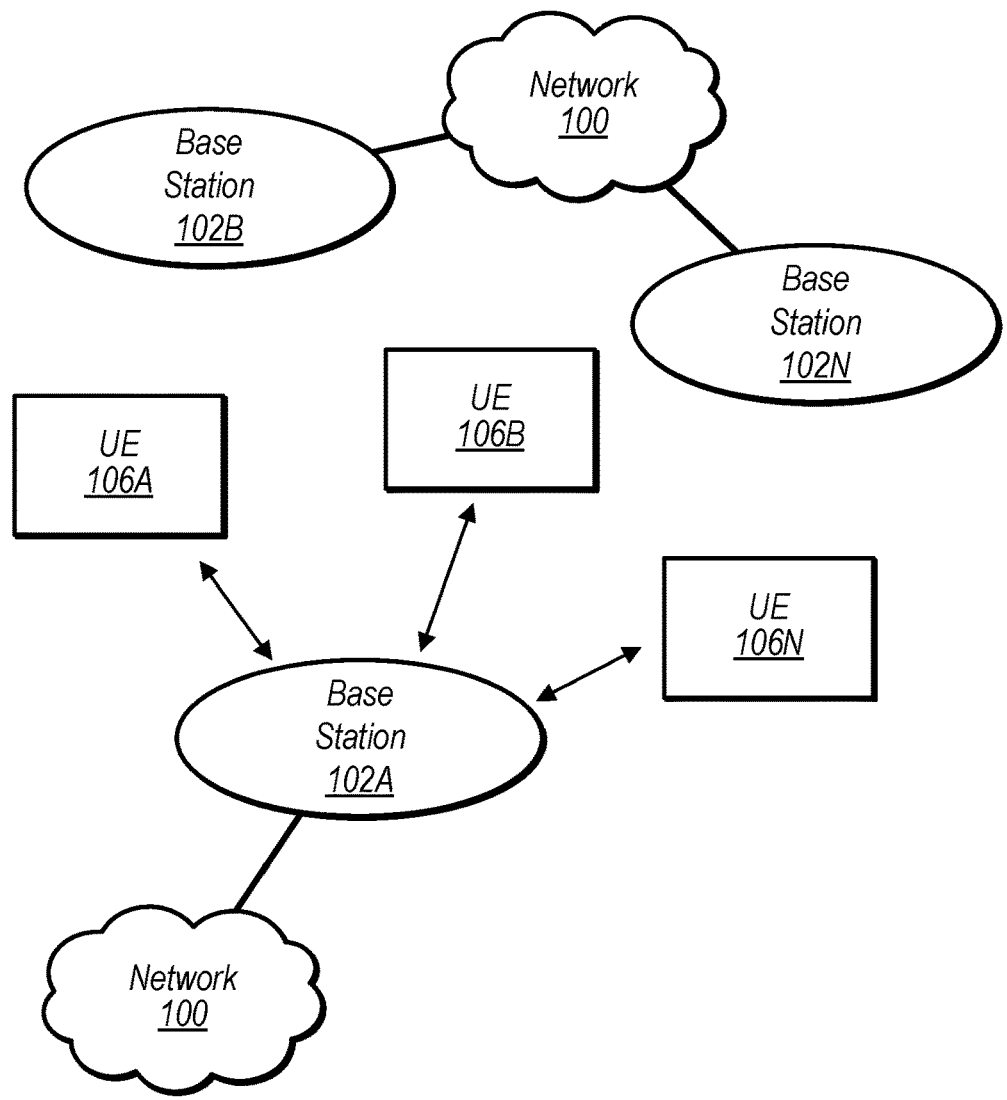
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
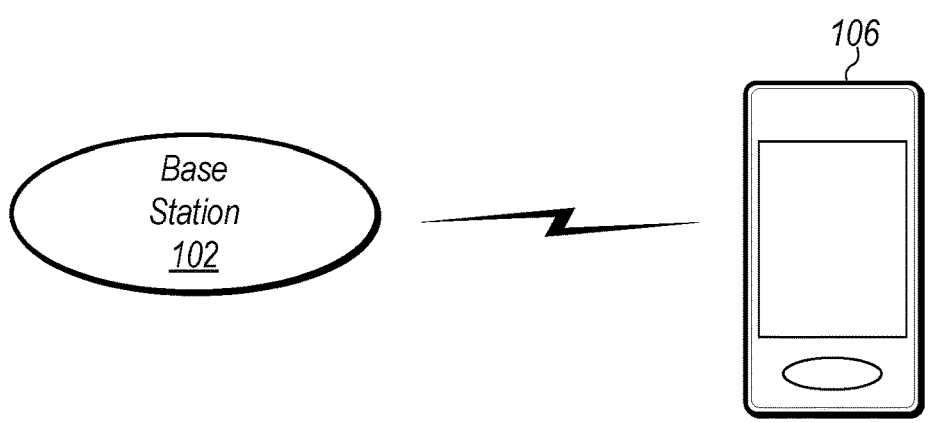
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
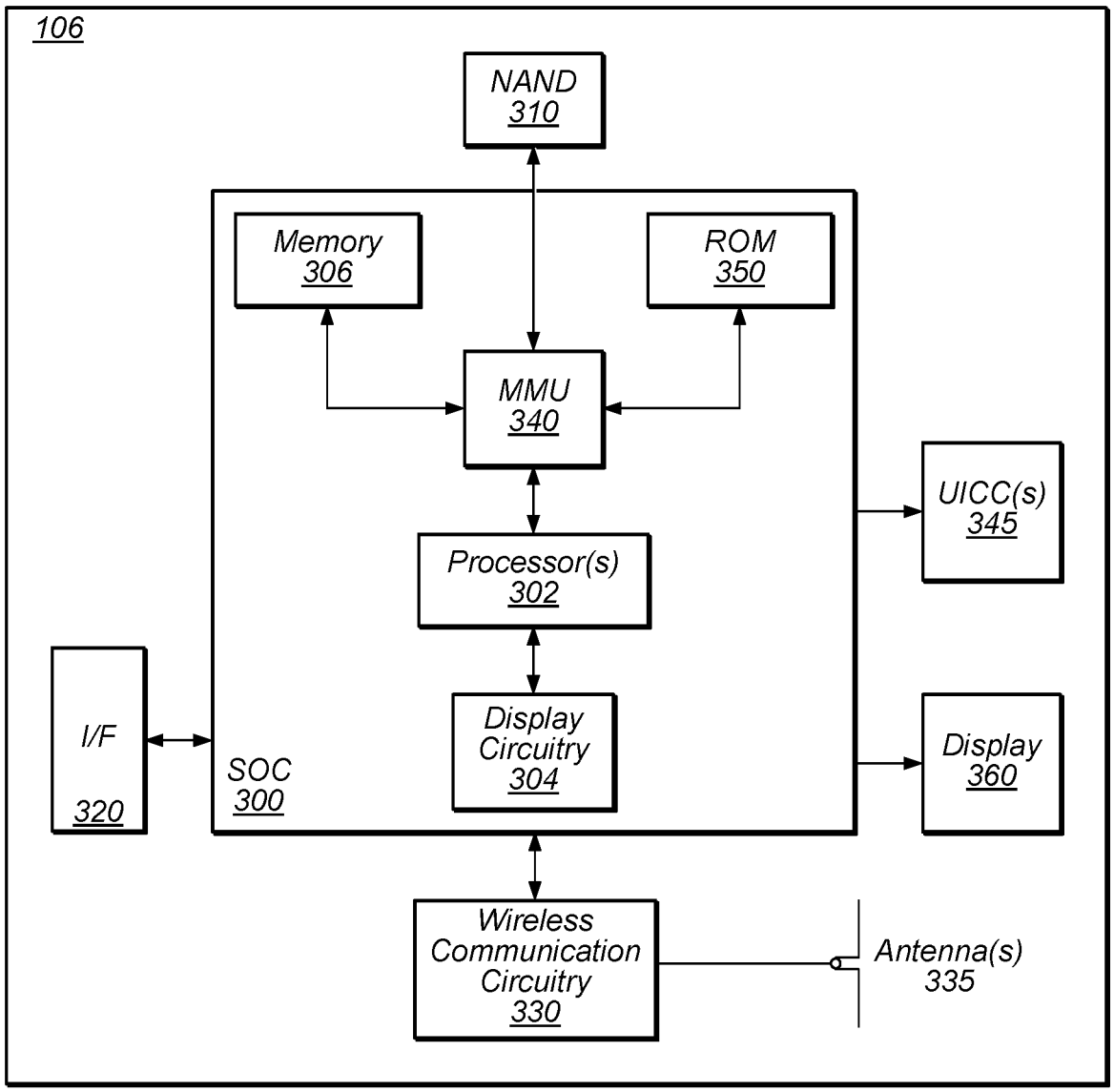
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
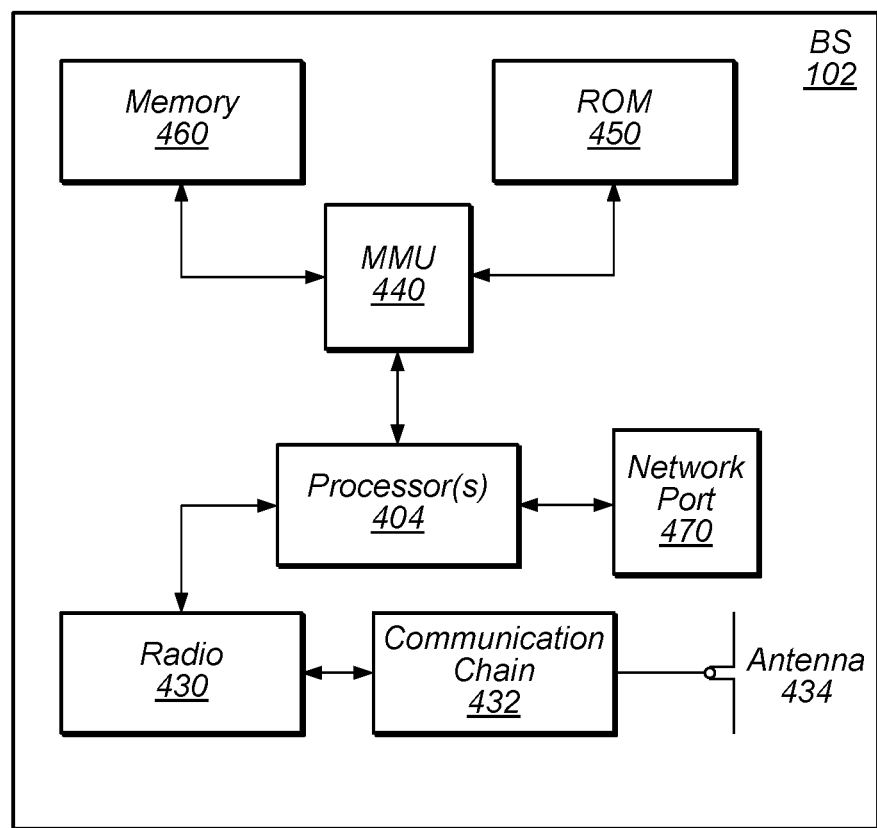
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
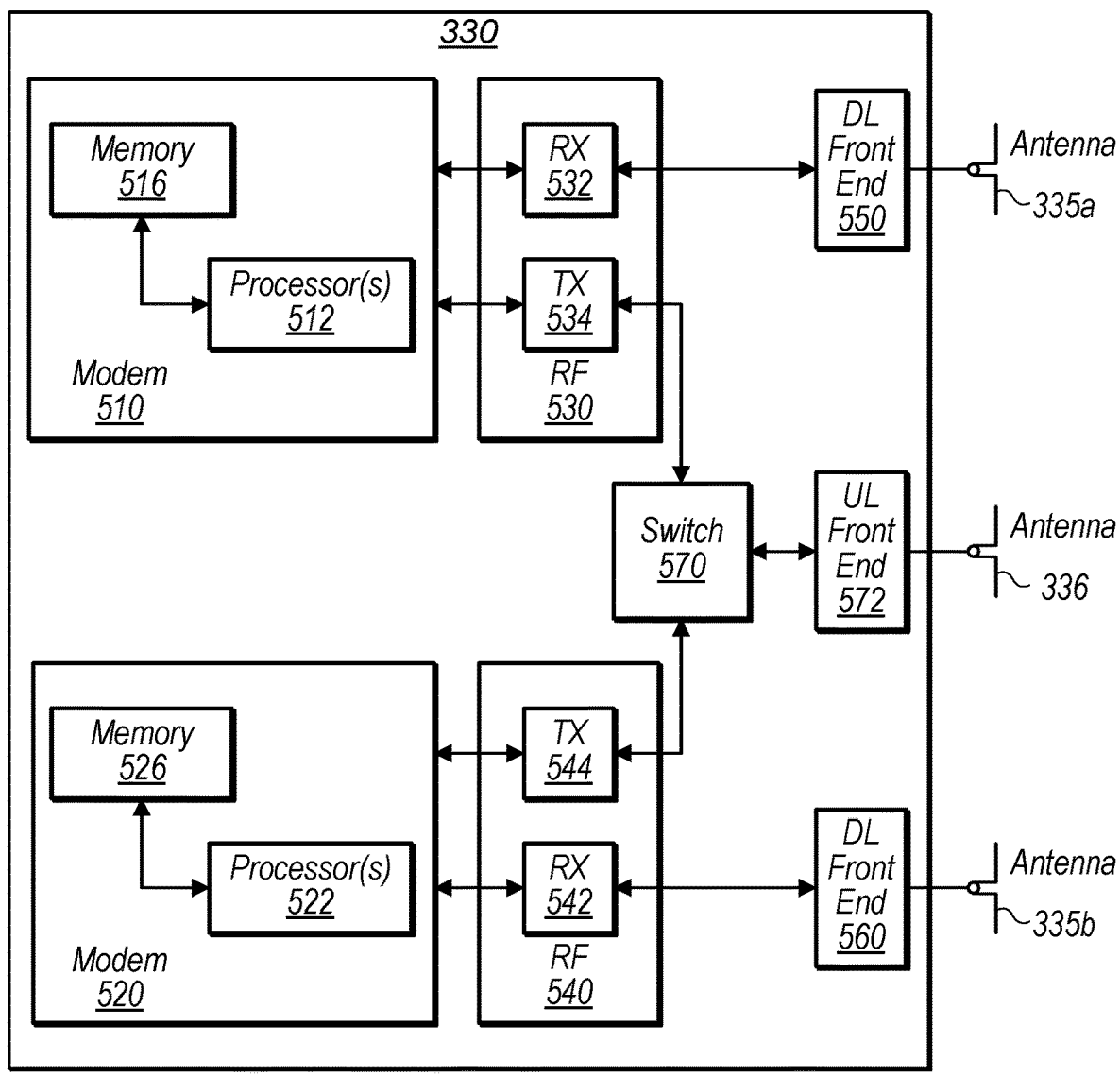
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a*-*b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572). In some scenarios, cellular communication circuitry 330 may receive instructions to transmit according to both the first RAT (e.g., as supported via modem 510) and the second RAT (e.g., as supported via modem 520) simultaneously. In such scenarios, switch 570 may be switched to a third state that allows modem 510 to transmit signals according to the first RAT (e.g., via a transmit chain that includes transmit circuitry 534 and UL front end 572) and modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

In some embodiments, the cellular communication circuitry 330 may couple (e.g., communicatively; directly or indirectly) to a plurality of antennas 336. For example, each of the FR front end 530 and the RF front end 540 may be connected to a respective antenna 336, e.g., via a respective UL front end 572.

Figure 6:
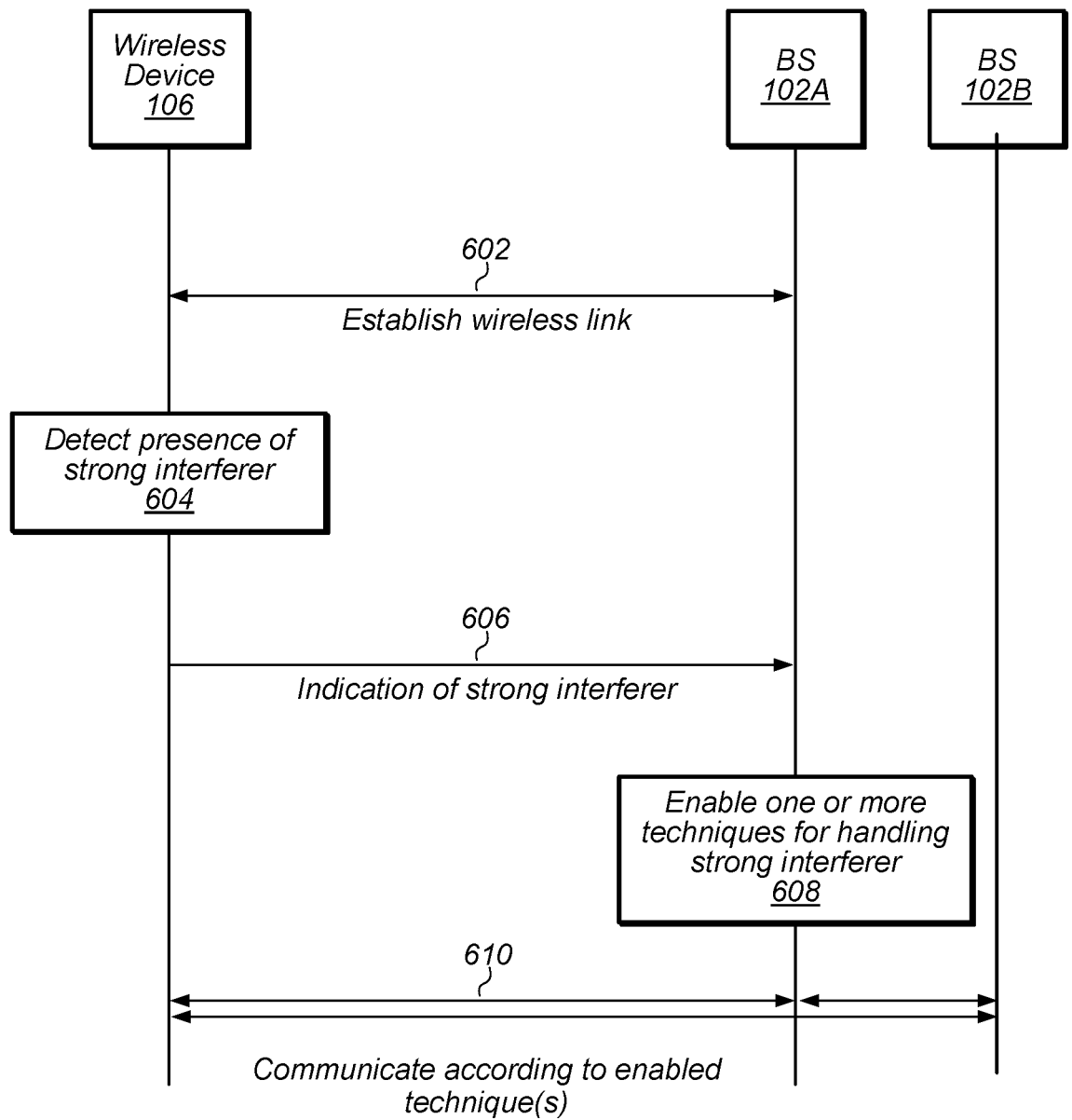
FIG. 6 is a flowchart diagram illustrating an example method for performing uplink and downlink communication in cell edge scenarios with improved reliability, according to some embodiments.

FIG. 6—Improved Reliability in Cell Edge Scenarios

New cellular communication techniques are continually under development, to increase coverage, to better serve the range of demands and use cases, and for a variety of other reasons. For example, a current area of study and development in cellular communication may include ultra reliable low latency communication (URLLC). One challenging aspect of providing such high reliability may include handling communication with wireless devices that occurs in cell edge scenarios. As part of such development, it would be useful to provide techniques that can improve reliability in such scenarios.

Accordingly, FIG. 6 is a signal flow diagram illustrating exemplary possible aspects of such techniques, at least according to some embodiments. Aspects of the method of FIG. 6 may be implemented by a wireless device such as a UE 106 illustrated in various of the Figures herein, one or more base stations such as a BS 102 illustrated in various of the Figures herein, and/or more generally in conjunction with any of the computer systems or devices shown in the above Figures, among other devices, as desired.

In various embodiments, some of the elements of the methods shown may be performed concurrently, in a different order than shown, may be substituted for by other method elements, or may be omitted. Additional elements may also be performed as desired. As shown, the method of FIG. 6 may operate as follows.

At 602, a wireless device and a cellular base station providing a serving cell to the wireless device may establish a wireless link. According to some embodiments, the wireless link may include a cellular link according to 5G NR. For example, the wireless device may establish a session with an AMF entity of the cellular network by way of a gNB that provides radio access to the cellular network. Note that the cellular network may also or alternatively operate according to another cellular communication technology (e.g., LTE, UMTS, CDMA2000, GSM, etc.), according to various embodiments.

Establishing the wireless link may include establishing an RRC connection with a serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may have been established between the wireless device and a previous serving cell of the wireless device, and the wireless link may be established by way of handover to the serving cellular base station illustrated in FIG. 6.

As part of establishing the RRC connection and/or in one or more other ways (e.g., via broadcast system information, via media access control (MAC) control elements, etc.), the base station may provide configuration information relating to reporting of strongly interfering cells, and/or other configuration information relating to possible cell edge scenarios, to the wireless device. Alternatively, some or all such information could be pre-agreed between the wireless device and the cellular base station, for example if the wireless device and the cellular base station are communicating according to a cellular communication standard that defines specific cell edge reporting configurations or parameters.

In 604, the wireless device may determine that another cell is strongly interfering with communication between the wireless device and its serving cell. For example, in the illustrated scenario of FIG. 6, the wireless device 106 may determine that the cellular base station 102B is strongly interfering with communication between the wireless device 106 and the cellular base station 102A.

The wireless device may detect the presence of such a strongly interfering cell (or a 'strong interferer') in any of various ways, as desired. For example, a cell may be considered to be strongly interfering if its cell strength is above a certain threshold, or within a certain threshold of the serving cell, or both, possibly for at least a certain amount of time (a 'time to trigger'). Additionally or alternatively, a hysteresis parameter could be used as part of the determination of whether a cell is strongly interfering, e.g., to avoid rapid alternation between a cell being considered strongly interfering and being considered not strongly interfering. Any of various other approaches to determining whether a cell is considered strongly interfering are also possible. The approach used may be determined based on configuration information provided by the network, or may be as specified by a cellular communication standard, or may be determined by the wireless device vendor, or based on some combination of such considerations, among various possibilities.

In 606, the wireless device may provide an indication of the strongly interfering cell to its serving cell. The indication may be provided based at least in part on determining that another cell is strongly interfering with communication between the wireless device and its serving cell. For example, such a determination may be considered an event (e.g., a mobility event) configured to trigger the wireless device to provide the indication. The indication may be provided using control signaling, such as by way of an RRC information element (IE) or media access control (MAC) control element (CE).

In 608, the serving cell of the wireless device may enable one or more techniques for handling the strong interferer. This may include coordinating with the cellular base station that provides the strongly interfering cell to transmit data to the wireless device and/or to receive data from the wireless device.

For example, as one possibility, the network may configure the wireless device to receive data from both the serving cell and the strongly interfering cell, e.g., using a physical downlink shared channel (PDSCH) from each cell. The different channels may have different scrambling, e.g., determined at least in part by a cell identifier and at least in part on a wireless device identifier. Additionally, the different channels may be scheduled using the same downlink control information (DCI), e.g., via a physical downlink control channel (PDCCH) from the serving cell (e.g., if there is ideal or otherwise sufficiently low latency backhaul between the cells), or may be scheduled by different DCI transmissions, e.g., with each cell providing the wireless device with DCI via its own PDCCH.

To provide improved reliability, the multiple cells may provide the same data (e.g., the same packet or transport block), which may thus have the same hybrid automatic repeat request (HARQ) identifier. The data may be transmitted by the multiple cells with the same HARQ redundancy version (RV) or with different HARQ RVs. Note that to avoid potential ambiguity, the serving cell HARQ new data indicator (NDI) may be given precedence when determining whether a new HARQ transmission or a HARQ retransmission is being performed. Thus, it may be possible to utilize what could otherwise be a strongly interfering cell (e.g., due to its relatively similar signal strength and/or quality to the serving cell) to a wireless device to improve the reliability of downlink data transmissions in a cell edge scenario, e.g., by providing an additional HARQ repetition that could be combined with the transmission from the serving cell to improve the likelihood of successful decoding.

As another possibility, the network may utilize a dynamic pointing and interference suppression approach using channel state information (CSI) feedback from the wireless device. According to such an approach, the network may configure the wireless device to provide CSI for both a channel between the wireless device and the serving cell and for a channel between the wireless device and the strongly interfering cell, e.g., at a relatively frequent rate (e.g, every 5 ms, every 10 ms, or at any other desired interval). Alternatively or additionally, the wireless device may be configured to report which cell is preferred by the wireless device in each CSI report.

The network may use such channel state information for both cells to dynamically determine from which cell to perform downlink transmissions while a strongly interfering cell is present. For example, based on each CSI report, the network may determine which of the serving cell or the strongly interfering cell is stronger for the wireless device at that time, and may accordingly determine to perform downlink transmissions from the stronger of the cells, at least until the next CSI report is received. The cell that is not selected to perform downlink transmissions to the wireless device in that instance may mute its transmission to the wireless device, e.g., to reduce potential interference. Thus, it may be possible to switch back and forth between which cell performs downlink transmissions and which cell mutes transmissions to a wireless device in a nimble manner, e.g., that may be able to account for short duration variations (such as certain fading conditions) in signal strength or quality between two cells with otherwise relatively similar signal strength or quality, such as may occur in a cell edge scenario.

In some implementation scenarios, such as in millimeter wave deployments, beam configuration may be an important consideration. To better support the possibility of a wireless device receiving transmissions from either or both of multiple cells, such as in a cell edge scenario, the network may be able to configure the wireless device with multiple transmission configuration indication (TCI) tables, e.g., such that each TCI table is associated with a different cell. Thus, the serving cell of the wireless device could configure the wireless device with a TCI table for itself and for the strongly interfering cell in such a scenario. Control information scheduling data transmissions may refer to the TCI table corresponding to the cell from which a data transmission is scheduled. Thus, if multiple DCI are used to schedule transmissions from multiple cells, the DCI from each cell may refer to the TCI table for the corresponding cell. If a single DCI transmission is used to schedule transmissions from multiple cells, a TCI table index may be used to identify which TCI table is referred to for each scheduled transmission.

As a still further possibility, the network may configure the wireless device to receive data from both the serving cell and the strongly interfering cell, e.g., using a multiple input multiple output (MIMO) transmission on a single PDSCH such that the different cells occupy different codewords (CWs) or layers. Thus, the data received by the wireless device from the serving cell may be one layer (or group of layers) or codeword of the MIMO transmission and the data received by the wireless device from the strongly interfering cell may be another layer (or group of layers) or codeword of the MIMO transmission.

To provide improved reliability, the different layers or codewords may correspond to the same data (e.g., the same packet or transport block). Explicit signaling may be used to indicate this, or the use of the same HARQ identifier for the different codewords/layers may implicitly indicate this. The data may have the same HARQ redundancy version (RV) or different HARQ RVs. Wireless device acknowledgement or negative acknowledgement feedback for one of the codewords layers may be sufficient, at least according to some embodiments. Note that such an approach may involve a high degree of coordination between the cells performing the MIMO transmission, e.g., potentially requiring an ideal or otherwise very low latency backhaul communication link between the cells.

In addition or as an alternative to the serving cell and the strongly interfering cell coordinating to improve the reliability of downlink communications to a wireless device in cell edge scenarios, it may also be possible for the serving cell and the strongly interfering cell to coordinate to improve the reliability of uplink communications in cell edge scenarios. Note that if desired, a different threshold or condition (or set of thresholds/conditions) may be used to trigger such uplink coordination than is used to trigger downlink coordination. For example, what is considered a strongly interfering cell for the purpose of triggering coordination with respect to uplink communication may differ from what is considered a strongly interfering cell for the purpose of triggering coordination with respect to downlink communication, as one possibility. Alternatively, similar or the same definitions may be used, if desired.

Coordinating to improve the reliability of uplink communications may include the serving cell configuring the strongly interfering cell to also receive uplink transmissions from the wireless device. For example, the serving cell may provide wireless device identifier information and timing advance information over an x2 interface, and/or other packet decoding information, to support the ability of the strongly interfering cell to receive and decode uplink transmissions by the wireless device. Thus, it may be possible that either or both cells may be able to receive the uplink communication, increasing the likelihood that the uplink communication is successfully received. In some instances (e.g., with sufficient coordination between the cells), it may be possible for the cells to perform receive combining with respect to uplink communications performed by the wireless device, e.g., to still further increase the likelihood of successful decoding.

Since there may be multiple cells receiving the uplink communications of the wireless device in such a scenario, there may be multiple options for handling acknowledgement and negative acknowledgement feedback and retransmission scheduling for such transmissions. For example, as one possibility, the wireless device may be configured to monitor multiple PDCCHs or multiple physical HARQ indicator channels (PHICHs) for potential scheduling of physical uplink shared channel retransmissions, such that retransmission scheduling information could be provided from either or both cells. As another possibility, the wireless device may be configured to monitor the PDCCH or PHICH for just the serving cell for potential scheduling of physical uplink shared channel retransmissions to both cells.

Thus, any or all of such techniques for coordinating between cells of similar strength, such as might occur when a wireless device is at a cell edge, may be used, individually or in combination, to improve the reliability of downlink and/or uplink communications of the wireless device.

FIGS. 7-13 and Additional Information

FIGS. 7-13 illustrate further aspects that might be used in conjunction with the method of FIG. 6 if desired. It should be noted, however, that the exemplary details illustrated in and described with respect to FIGS. 7-13 are not intended to be limiting to the disclosure as a whole: numerous variations and alternatives to the details provided herein below are possible and should be considered within the scope of the disclosure.

Figure 7:
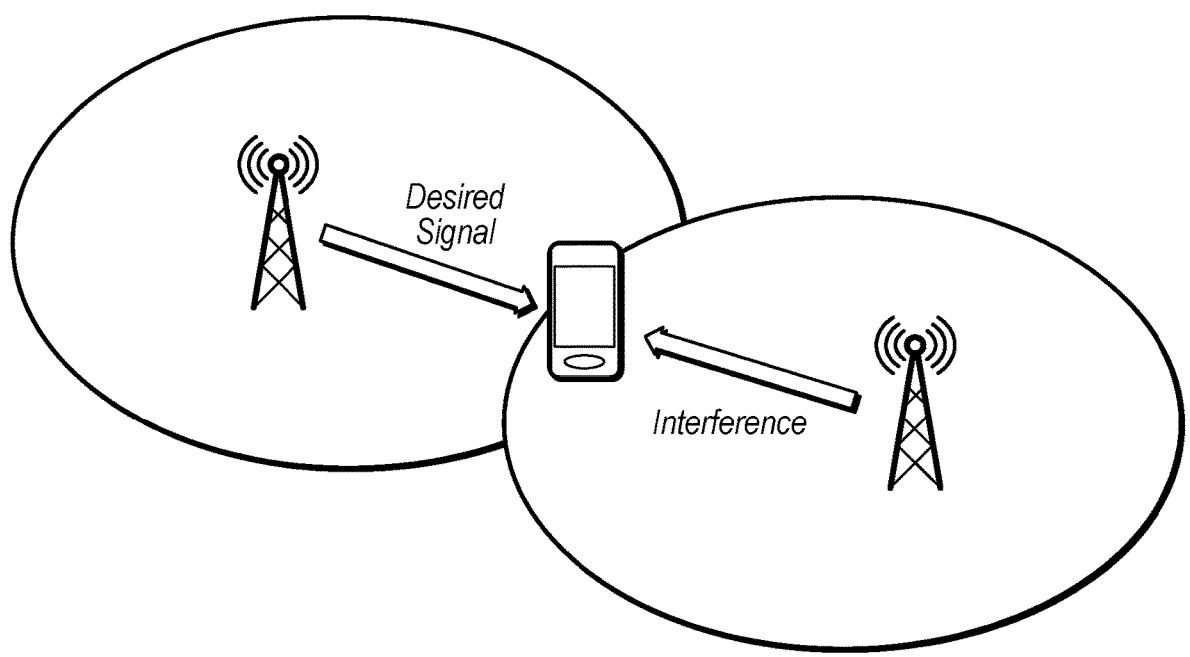
FIG. 7 illustrates aspects of an exemplary cell edge scenario in which a strongly interfering cell is present, according to some embodiments.

Ultra reliable and low latency communication (URLLC) is a category of cellular communication currently under development at least with respect to 3GPP fifth generation (5G) new radio (NR) communication. At least according to some embodiments, URLLC may have extremely low latency and high reliability requirements, such as less than 0.001% packet error rate at a 1 ms delay bound. Meeting such requirements may be particularly challenging for cell edge users, which may be farthest from the serving cell and may also potentially experience strong interference from the neighboring cell(s). FIG. 7 illustrates aspects of an exemplary such cell edge scenario in which a strongly interfering cell is present, according to some embodiments. Several mechanisms are proposed herein that can be used to improve reliability for cell edge users, potentially including for URLLC communication, at least according to some embodiments.

Note, though, that while URLLC having 0.001% packet error rate at a 1 ms delay bound as a requirement may represent one possible example of a scenario in which high reliability low latency communication may be desirable, other possible latency and reliability requirements for URLLC may also be possible, and also that other types of cellular communication may also have very high reliability and low latency requirements and so may also benefit from the techniques described herein, at least according to some embodiments.

In order to support techniques for improving reliability for cell edge users for which a strong interferer is present, it may be useful to support a mobility event that allows a wireless user equipment (UE) device to report the appearance and disappearance of a strongly interfering cell to the network. Such reporting can be event-triggered, e.g., based on cell measurements, possibly with hysteresis, time to trigger, and/or counter conditions to avoid reporting only briefly strongly interfering cells and/or to avoid ping-ponging between reporting a cell as a strong interferer and reporting a cell as no longer being a strong interferer.

Figure 8:
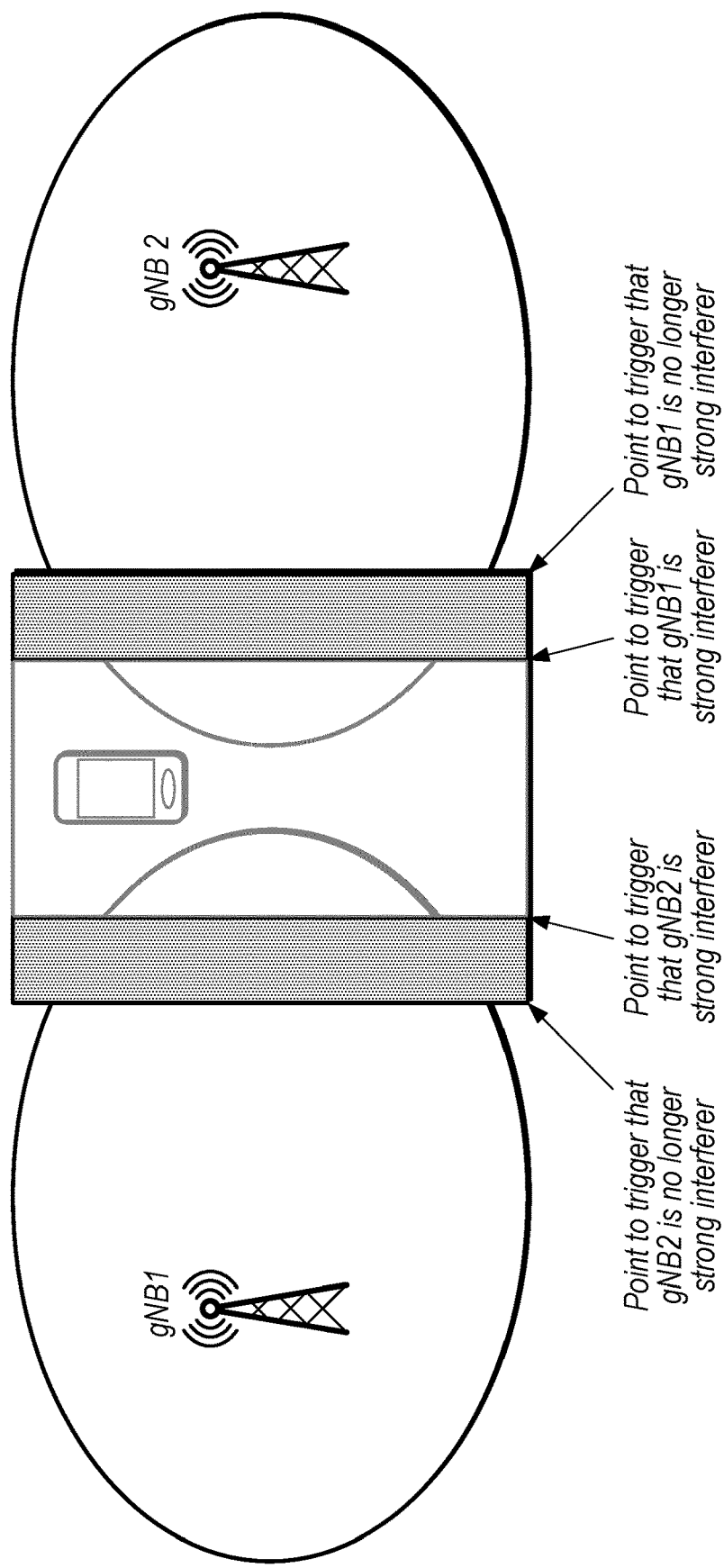
FIG. 8 illustrates aspects of an exemplary framework for reporting strongly interfering cells, according to some embodiments.

FIG. 8 illustrates aspects of such an exemplary framework for reporting strongly interfering cells, according to some embodiments. As shown, the conditions based on which strong interferer reporting is supported may effectively create several zones that a wireless device may travel through, e.g., when moving from gNB1 to gNB2 or vice versa. For example, a wireless device that is served by gNB1 and is moving towards the edge of the cell may determine that gNB2 is a strong interferer when it reaches the location indicated "point to trigger that gNB2 is strong interferer". If the wireless device moves back towards the center of the cell provided by gNB1, the wireless device may determine that gNB2 is no longer a strong interferer when it reaches the location indicated "point to trigger that gNB2 is no longer strong interferer". Note that the shadowed area between such locations may represent an areas in which gNB2 may or may not be considered a strong interferer, depending on a path of the UE, e.g., due to one or more parameters that introduce hysteresis to the determination of whether a cell is considered strongly interfering. A wireless device that is served by gNB2 and is moving towards the edge of the cell may make similar determinations at the similarly indicated locations with respect to the cell provided by gNB2. Thus, while in the non-shadowed area between gNB1 and gNB2, the wireless device may generally be served by one of gNB1 or gNB2 while the other of gNB1 or gNB2 may be considered a strong interferer.

Figure 9:
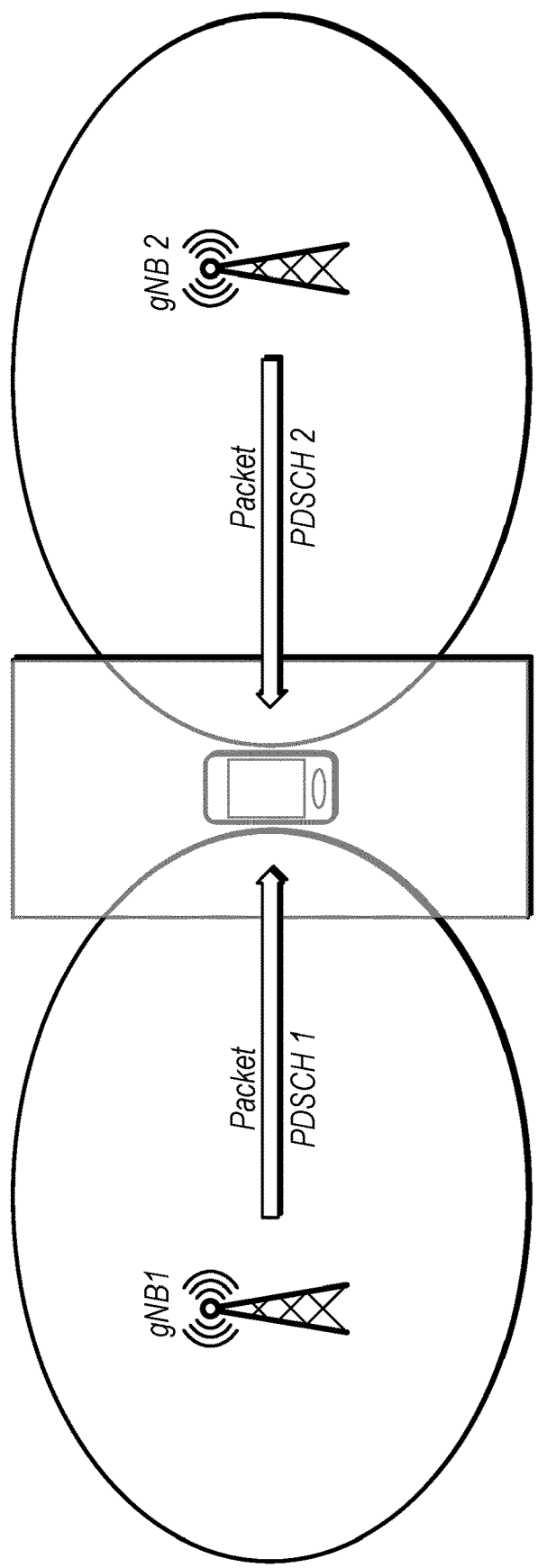
FIG. 9 illustrates aspects of an exemplary approach to performing downlink communication in a cell edge scenario, according to some embodiments.

FIG. 9 illustrates aspects of an exemplary approach to performing downlink communication in such a cell edge scenario, e.g., in which a wireless device is served by one of gNB1 or gNB2 while the other of gNB1 or gNB2 is considered a strong interferer (e.g., due to reporting by the UE). In the illustrated scenario, the UE may be configured to receive more than 1 PDSCH from multiple TRPs/gNBs simultaneously. The two PDSCH can be scheduled with the same DCI (e.g., using a single PDCCH from one of the gNBs, such as the one providing the serving cell) or different DCI (e.g., using multiple PDCCHs, e.g., potentially including one from each cell). The two PDSCH may have different scrambling, which may be determined partly by the gNB ID and the UE ID. The two PDSCH transmissions may map to the same HARQ ID and the serving cell HARQ NDI may have precedence over the non-serving cell.

Figure 10:
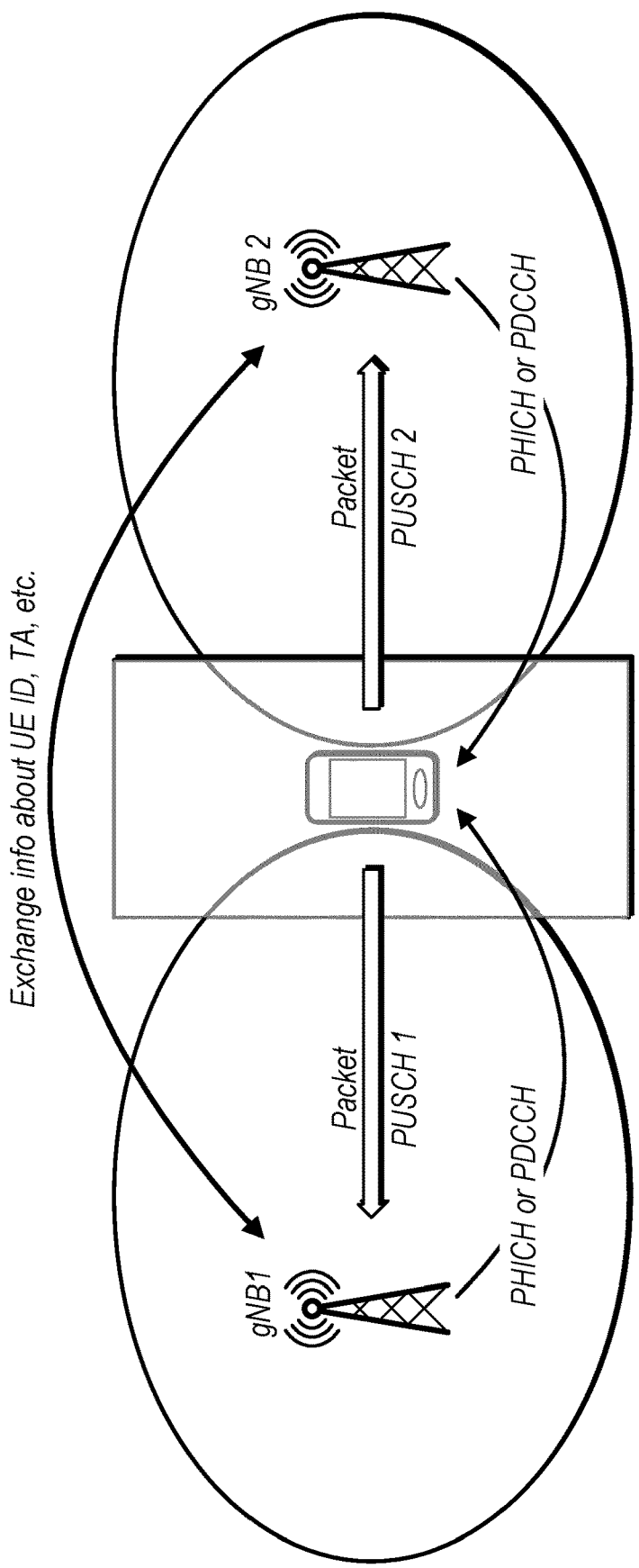
FIG. 10 illustrates aspects of an exemplary approach to performing uplink communication in a cell edge scenario, according to some embodiments.

FIG. 10 illustrates aspects of an exemplary approach to performing uplink communication in a cell edge scenario, according to some embodiments. In the illustrated scenario, the gNBs may coordinate to receive the UE's uplink transmissions simultaneously. The gNBs may exchange the UE ID and timing advance (TA) information over the x2 interface. The gNBs may also exchange the packet decoding information. The UE may monitor multiple PHICH or PDCCH to check for scheduling of retransmissions of the PUSCH.

Figure 11:
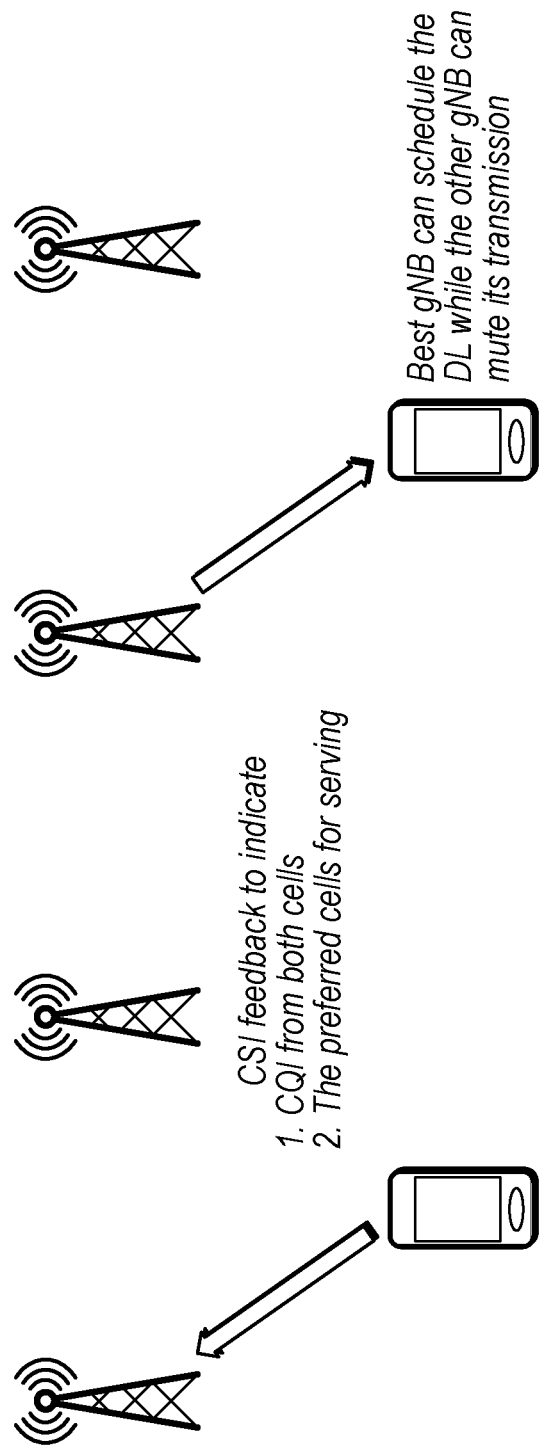
FIG. 11 illustrates aspects of another exemplary approach to performing downlink communication in a cell edge scenario, according to some embodiments.

FIG. 11 illustrates aspects of a dynamic pointing and interference suppression to performing downlink communication in a cell edge scenario, according to some embodiments. In this approach, the UE CSI report may include multiple channel quality indicator (CQI) values corresponding to different cells, and/or may indicate the preferred cell among the serving cell and any strongly interfering cells. The best/preferred gNB among those reported may schedule and perform downlink transmissions to the UE at any given time. Thus, it may be the case that different gNBs are selected to schedule and perform downlink transmissions to the UE at different times, such that in some instances the serving cell may schedule and perform downlink transmissions, while in other instances the non-serving cell that was reported as a strong interferer may schedule and perform downlink transmissions.

Note that in such an approach, it may also be possible for the UE to monitor the DCI from only the serving cell (e.g., such that the serving cell could schedule downlink transmissions that are then performed by the non-serving cell) if ideal backhaul between the gNBs can be achieved. Alternatively, the UE may monitor the DCI from each cell. The gNB that is not selected to perform a downlink transmission at a given downlink transmission opportunity may mute its transmission in order to reduce interference to the UE.

Figure 12:
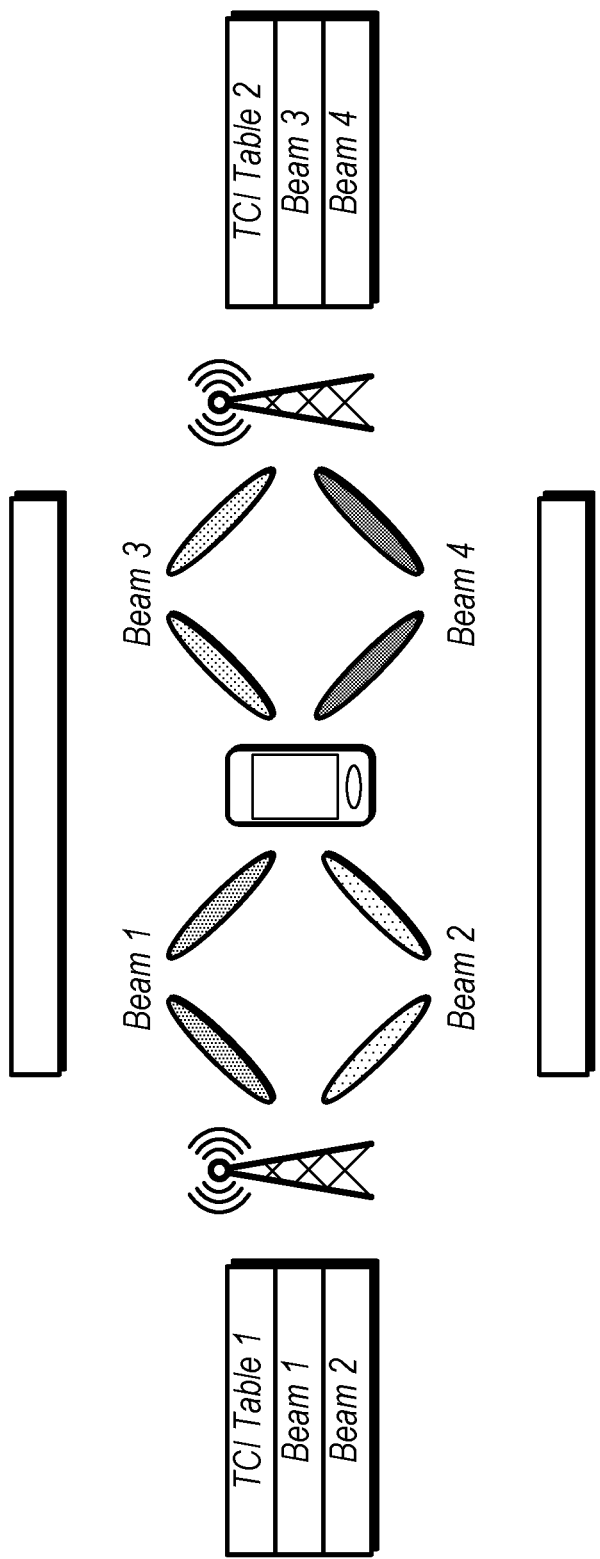
FIG. 12 illustrates still further possible aspects of an exemplary approach to performing downlink communication in a cell edge scenario, according to some embodiments.

FIG. 12 illustrates a possible beam management enhancement for performing downlink communication in a cell edge scenario, according to some embodiments. For cell edge scenarios in which a UE may potentially receive downlink communications from or perform uplink communications to any or all of multiple cells, it may be useful to support a UE being configured with multiple TCI tables, e.g., such that each gNB has a corresponding TCI table configured at the UE. DCI scheduling may use the corresponding TCI table if multiple DCI are supported. Alternatively, if single DCI is supported, the DCI scheduling may also include a table index indicating from which TCI table a TCI parameter is selected for a communication being scheduled. Thus, using such an approach, it may be possible to support the possibility of any of multiple beams to or from multiple gNBs to be configured when scheduling a communication, at least according to some embodiments.

Figure 13:
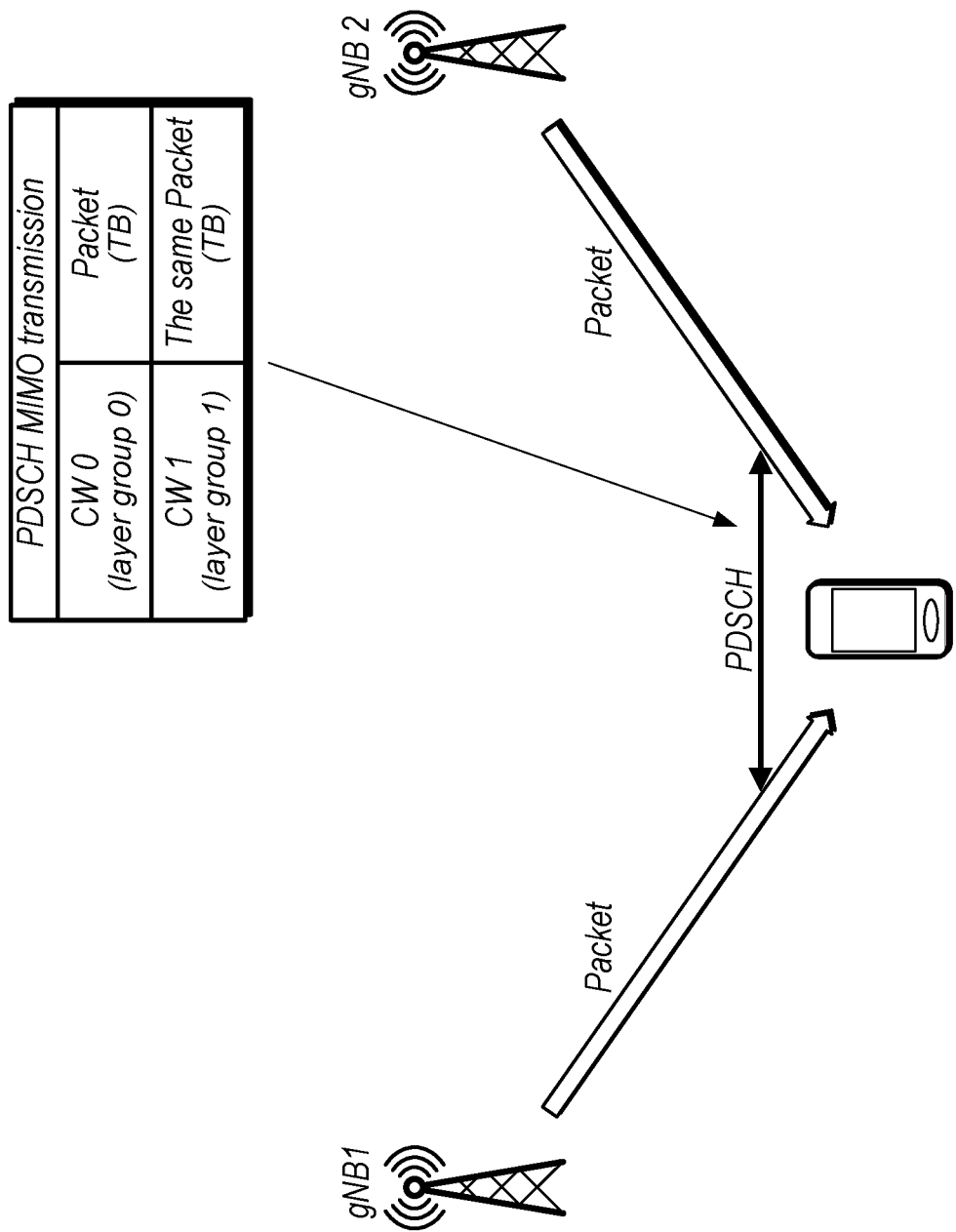
FIG. 13 illustrates aspects of a still further exemplary approach to performing downlink communication in a cell edge scenario, according to some embodiments.

FIG. 13 illustrates aspects of a still further exemplary approach to performing downlink communication in a cell edge scenario, according to some embodiments. In the illustrated scenario, a single DCI may be used to support simultaneous packet repetition from two gNBs using a single PDSCH. The different gNBs may occupy different layers or codewords of the transmissions, such that the transmission may effectively be a MIMO transmission. An indication may be provided to the UE that the different layers or codewords correspond to the same transport block/packet, e.g., via explicit signaling or by use of the same HARQ ID for the layers/codewords. In such an approach, it may be the case that UE ACK/NACK feedback may only be needed for one codeword, at least according to some embodiments.

Note that such an approach may require a certain level of coordination (e.g., possibly requiring ideal or near-ideal backhaul) between the gNBs and may introduce additional complexity on both the network side and the UE side, e.g., relative to other approaches described herein. Such an approach may also provide increased reliability/robustness relative to at least some of those other approaches, at least in some instances.

In the following further exemplary embodiments are provided.

One set of embodiments may include a wireless device, comprising: at least one antenna; at least one radio coupled to the at least one antenna; and a processing element coupled to the at least one radio; wherein the wireless device is configured to: establish a radio resource control connection with a first cell; determine that a second cell is strongly interfering with communication between the wireless device and the first cell; provide an indication that the second cell is strongly interfering to the first cell; and receive data that has a same hybrid automatic repeat request (HARQ) identifier from both the first cell and the second cell based at least in part on providing the indication that the second cell is strongly interfering.

According to some embodiments, the wireless device is further configured to: receive control information from the first cell that schedules the data received from both the first cell and the second cell.

According to some embodiments, the data received from the first cell is scrambled based at least in part on an identifier for the first cell and an identifier for the wireless device, wherein the data received from the second cell is scrambled based at least in part on an identifier for the second cell and the identifier for the wireless device.

According to some embodiments, the wireless device is further configured to: treat a HARQ new data indicator (NDI) for the first cell with precedence over a HARQ NDI for the second cell based at least in part on the first cell being a serving cell of the wireless device.

According to some embodiments, the wireless device is further configured to: receive control information scheduling an uplink transmission to both the first cell and the second cell based at least in part on providing the indication that the second cell is strongly interfering; perform the uplink transmission; and monitor a control channel for each of the first cell and the second cell for retransmission scheduling for the uplink transmission.

According to some embodiments, the wireless device is further configured to: receive configuration information providing a transmission control indication (TCI) table for each of the first cell and the second cell based at least in part on providing the indication that the second cell is strongly interfering, wherein control information scheduling the data comprises TCI information for first cell from the TCI table for the first cell and TCI information for the second cell from the TCI table for the second cell.

According to some embodiments, the data received from the first cell comprises a first one or more layers of a multiple input multiple output (MIMO) transmission to the wireless device, wherein the data received from the second cell comprises a second one or more layers of the MIMO transmission to the wireless device, wherein the wireless device is further configured to: provide acknowledgement or negative acknowledgement feedback for only one of the first one or more layers or the second one or more layers.

According to some embodiments, determining that the second cell is strongly interfering with communication between the wireless device and the first cell is based at least in part on one or more of: signal strength of the second cell being above a predetermined threshold; a difference between signal strength of the first cell and signal strength of the second cell being less than a predetermined threshold; a hysteresis parameter; or a time-to-trigger parameter.

According to some embodiments, the wireless device is further configured to: determine that the second cell is no longer strongly interfering with communication between the wireless device and the first cell; and provide an indication that the second cell is no longer strongly interfering to the first cell.

Another set of embodiments may include an apparatus, comprising: a processing element configured to cause a wireless device to: establish a radio resource control connection with a first cell; determine that a second cell is strongly interfering with communication between the wireless device and the first cell; provide an indication that the second cell is strongly interfering to the first cell; receive control information configuring the wireless device to provide channel state information for both the first cell and the second cell based at least in part on the indication that the second cell is strongly interfering to the first cell; and provide the channel state information for both the first cell and the second cell based at least in part on the control information.

According to some embodiments, the processing element is further configured to cause the wireless device to: monitor a control channel for both the first cell and the second cell based at least in part on the control information.

According to some embodiments, the processing element is further configured to cause the wireless device to: receive control information indicating on which of the first cell or the second cell a downlink transmission to the wireless device is scheduled, wherein on which of the first cell or the second cell the downlink transmission to the wireless device is scheduled is selected based at least in part on the channel state information for both the first cell and the second cell.

According to some embodiments, the control information indicating on which of the first cell or the second cell a downlink transmission to the wireless device is scheduled is received from a cell on which the downlink transmission is scheduled.

According to some embodiments, a cell on which the downlink transmission is not scheduled mutes transmission during the downlink transmission.

According to some embodiments, the processing element is further configured to cause the wireless device to: receive control information scheduling an uplink transmission to both the first cell and the second cell based at least in part on providing the indication that the second cell is strongly interfering; and perform the uplink transmission.

A further set of embodiments may include a first cellular base station, comprising: at least one antenna; at least one radio coupled to the at least one antenna; and a processing element coupled to the at least one radio; wherein the first cellular base station is configured to: receive an indication of a strongly interfering cell from a wireless device; coordinate with a second cellular base station to transmit data to the wireless device based at least in part on the indication of the strongly interfering cell, wherein the second cellular base station provides the strongly interfering cell.

According to some embodiments, to coordinate with the second cellular base station, the first cellular base station is further configured to: transmit data to the wireless device that has a same hybrid automatic repeat request (HARQ) identifier as data transmitted to the wireless device by the second cellular base station.

According to some embodiments, to coordinate with the second cellular base station, the first cellular base station is further configured to: provide downlink control information to the wireless device that schedules data transmissions to the wireless device from both the first cellular base station and the second cellular base station.

According to some embodiments, the first cellular base station is further configured to coordinate with the second cellular base station to receive data from the wireless device based at least in part on the indication of the strongly interfering cell, wherein to coordinate with the second cellular base station, the first cellular base station is further configured to: provide wireless device identifier information used to encrypt the data from the wireless device to the second cellular base station; and provide timing advance information for the wireless device to the second cellular base station.

According to some embodiments, to coordinate with the second cellular base station, the first cellular base station is further configured to: configure the wireless device to provide channel state information for both a channel between the wireless device and the first cellular base station and a channel between the wireless device and the second cellular base station; receive the channel state information from the wireless device; and determine, at each of a plurality of transmission opportunities, whether a downlink transmission to the wireless device will be performed from the first cellular base station or from the second cellular base station; perform downlink transmissions to the wireless device during transmission opportunities when it is determined that a downlink transmission to the wireless device will be performed from the first cellular base station; and mute transmissions during transmission opportunities when it is determined that a downlink transmission to the wireless device will be performed from the second cellular base station.

According to some embodiments, to coordinate with the second cellular base station, the first cellular base station is further configured to: provide a first codeword of a multiple input multiple output (MIMO) transmission to the wireless device, wherein a second codeword of the MIMO transmission to the wireless device is provided by the second cellular base station, wherein each of the first codeword and the second codeword of the MIMO transmission comprise a same transport block.

A yet further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
   at least one antenna;
   at least one radio coupled to the at least one antenna; and
   a processor coupled to the at least one radio;
   wherein the wireless device is configured to:
      establish a radio resource control connection with a first transmission and reception point (TRP);
      receive a single downlink control information (DCI) message from the first TRP that schedules a transport block from both the first TRP and a second TRP, wherein the single DCI provides a first transmission configuration (TCI) for the first TRP and a second TCI for the second TRP; and
      receive separate transmissions of the transport block according to the first TCI from the first TRP and according to the second TCI from the second TRP that have a same hybrid automatic repeat request (HARQ) identifier.

2. The wireless device of claim 1,
   wherein the transmission received from the first TRP is scrambled based at least in part on an identifier for the first TRP and an identifier for the wireless device,
   wherein the transmission received from the second TRP is scrambled based at least in part on an identifier for the second TRP and the identifier for the wireless device.

3. The wireless device of claim 1, wherein the wireless device is further configured to:
   treat a HARQ new data indicator (NDI) for the first TRP with precedence over a HARQ NDI for the second TRP.

4. The wireless device of claim 1, wherein the wireless device is further configured to:
   provide an indication to the first TRP that the second TRP is strongly interfering;
   receive control information scheduling an uplink transmission to both the first TRP and the second TRP based at least in part on providing the indication that the second TRP is strongly interfering;
   perform the uplink transmission; and
   monitor a control channel for each of the first TRP and the second TRP for retransmission scheduling for the uplink transmission.

5. The wireless device of claim 1, wherein the wireless device is further configured to:
   receive configuration information providing a TCI table for each of the first TRP and the second TRP,
   wherein the single DCI comprises TCI information from the TCI table for the first TRP and TCI information from the TCI table for the second TRP.

6. The wireless device of claim 1,
   wherein the transmission of the transport block received from the first TRP comprises a first one or more layers of a multiple input multiple output (MIMO) transmission to the wireless device,
   wherein the transmission of the transport block received from the second TRP comprises a second one or more layers of the MIMO transmission to the wireless device,
   wherein the wireless device is further configured to:
   provide acknowledgement or negative acknowledgement feedback for only one of the first one or more layers or the second one or more layers.

7. The wireless device of claim 1, wherein the wireless device is further configured to determine that the second TRP is strongly interfering with communication between the wireless device and the first TRP, wherein the determination that the second TRP is strongly interfering with communication between the wireless device and the first TRP is based at least in part on one or more of:
   signal strength of the second TRP being above a predetermined threshold;
   a difference between signal strength of the first TRP and signal strength of the second TRP being less than a predetermined threshold;
   a hysteresis parameter; or
   a time-to-trigger parameter.

8. The wireless device of claim 1, wherein the wireless device is further configured to:
   determine that the second TRP is no longer strongly interfering with communication between the wireless device and the first TRP; and
   provide an indication to the first TRP that the second TRP is no longer strongly interfering to the first TRP.

9. A cellular base station, comprising:
   at least one antenna;
   at least one radio coupled to the at least one antenna; and
   a processor coupled to the at least one radio;
   wherein the cellular base station is configured to:
      transmit, to a wireless device from a first transmission and reception point (TRP), a single downlink control information (DCI) message that schedules a transport block from both the first TRP and a second TRP, wherein the single DCI provides a first transmission configuration (TCI) for the first TRP and a second TCI for the second TRP; and transmit, to the wireless device, separate transmissions of the transport block according to the first TCI from the first TRP and according to the second TCI from the second TRP that have a same hybrid automatic repeat request (HARQ) identifier.

10. The cellular base station of claim 9,
wherein the transmission from the first TRP is scrambled based at least in part on an identifier for the first TRP and an identifier for the wireless device,
wherein the transmission from the second TRP is scrambled based at least in part on an identifier for the second TRP and the identifier for the wireless device.

11. The cellular base station of claim 9,
wherein the cellular base station is further configured to:
provide configuration information including a TCI table for each of the first TRP and the second TRP, wherein the single DCI comprises TCI information from the TCI table for the first TRP and TCI information from the TCI table for the second TRP.

12. The cellular base station of claim 9,
wherein the transmission of the transport block from the first TRP comprises a first one or more layers of a multiple input multiple output, MIMO, transmission to the wireless device,
wherein the transmission of the transport block from the second TRP comprises a second one or more layers of the MIMO transmission to the wireless device,
wherein the cellular base station is further configured to:
receive, from the wireless device, acknowledgement or negative acknowledgement feedback for only one of the first one or more layers or the second one or more layers.

13. The cellular base station of claim 9,
wherein the cellular base station is further configured to:
receive channel state information from the wireless device; and
determine, at each of a plurality of transmission opportunities, whether a downlink transmission to the wireless device will be performed from the first TRP or from the second TRP.

14. The cellular base station of claim 9,
wherein the separate transmissions of the transport block from the first TRP and the second TRP comprise a first codeword of a multiple input multiple output (MIMO) transmission and a second codeword of the MIMO transmission.

15. A method, comprising:
at a wireless device:
establishing a radio resource control connection with a first transmission and reception point (TRP);
receiving a single downlink control information (DCI) message from the first TRP that schedules a transport block from both the first TRP and a second TRP, wherein the single DCI provides a first transmission configuration (TCI) for the first TRP and a second TCI for the second TRP; and
receiving separate transmissions of the transport block according to the first TCI from the first TRP and according to the second TCI from the second TRP that have a same hybrid automatic repeat request (HARQ) identifier.

16. The method of claim 15, further comprising:
monitoring a control channel for both the first TRP and the second TRP.

17. The method of claim 15,
wherein the transmission received from the first TRP is scrambled based at least in part on an identifier for the first TRP and an identifier for the wireless device,
wherein the transmission received from the second TRP is scrambled based at least in part on an identifier for the second TRP and the identifier for the wireless device.

18. The method of claim 15, further comprising:
treating a HARQ new data indicator (NDI) for the first TRP with precedence over a HARQ NDI for the second TRP.

19. The method of claim 15, further comprising:
receiving control information scheduling an uplink transmission to both the first TRP and the second TRP;
performing the uplink transmission; and
monitoring a control channel for each of the first TRP and the second TRP for retransmission scheduling for the uplink transmission.

20. The method of claim 15, further comprising:
receiving configuration information providing a TCI table for each of the first TRP and the second TRP, wherein the single DCI comprises TCI information from the TCI table for the first TRP and TCI information from the TCI table for the second TRP.

* * * * *